United States Patent [19]

Takei

[11] Patent Number: 4,740,672
[45] Date of Patent: Apr. 26, 1988

[54] CONTROL DEVICE FOR COOKING APPARATUS WITH TIMER FUNCTION, UTILIZING AN INTERRUPTION PROCEDURE

[75] Inventor: Tamotsu Takei, Nagoya, Japan

[73] Assignee: Kabushiki Kaisha Toshiba, Kawasaki, Japan

[21] Appl. No.: 26,220

[22] Filed: Mar. 16, 1987

[30] Foreign Application Priority Data

Apr. 9, 1986 [JP] Japan .................. 61-81533

[51] Int. Cl.⁴ .............................................. H05B 6/68
[52] U.S. Cl. .......................... 219/492; 219/10.55 B; 219/506; 99/325; 368/9
[58] Field of Search ............... 219/10.55 B, 10.55 R, 219/492, 506; 99/325, 332; 368/9, 10, 187, 188; 200/37 R, 38 FA, 36; 340/347 R

[56] References Cited

U.S. PATENT DOCUMENTS

| 3,388,223 | 6/1968 | Marchand | 200/36 |
|---|---|---|---|
| 4,222,010 | 9/1980 | Meisner et al. | 368/188 |
| 4,246,650 | 1/1981 | Moritani et al. | 368/188 X |
| 4,348,753 | 9/1982 | Werner et al. | 368/188 |
| 4,367,387 | 1/1983 | Tachihara et al. | 219/10.55 B |
| 4,430,540 | 2/1984 | Scalf | 219/10.55 B |
| 4,449,832 | 5/1984 | Kammerer | 368/187 |
| 4,504,716 | 3/1985 | Sakamoto | 368/187 X |

FOREIGN PATENT DOCUMENTS 56-157730 12/1981 Japan .

Primary Examiner—Philip H. Leung
Attorney, Agent, or Firm—Cushman, Darby & Cushman

[57] ABSTRACT

A housing of a cooking apparatus has a heating chamber and an operation section. Cooking operation keys are arranged to allow a user to perform cooking operations in the operation section. A display is arranged in the operation section for displaying at least numerical information. A cooking time-setter is arranged to set a required cooking time in the operation section, upon rotation of the setter. An encoder is coupled to the cooking time-setter, and it generates pulse signals, the number of pulses corresponding to the angular position of the cooking time-setter. A controller is connected to the heating chamber, the cooking operation keys, the display, and the encoder. The controller executes an interruption procedure in response to the pulse signals from the encoder, counts the pulses of the pulse signals, fetches the count values as the cooking time-setting information of the cooking time-setter, and supplies the cooking time-setting information to the display. At the same time, the controller supplies a control signal, corresponding to the cooking time-setting information, to the heating chamber, in accordance with the operation of the cooking operation section.

4 Claims, 3 Drawing Sheets

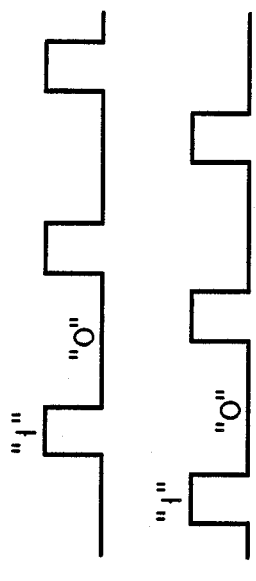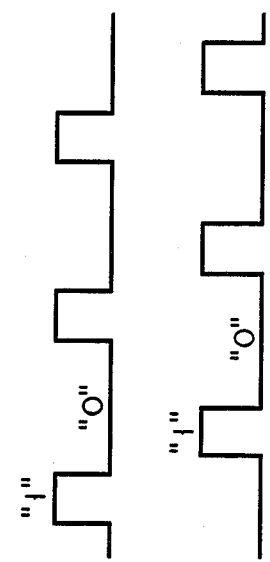
F I G. 5A  OUTPUT OF 21
F I G. 5B  OUTPUT OF 22
F I G. 6A  OUTPUT OF 21
F I G. 6B  OUTPUT OF 22

CONTROL DEVICE FOR COOKING APPARATUS WITH TIMER FUNCTION, UTILIZING AN INTERRUPTION PROCEDURE

BACKGROUND OF THE INVENTION

This invention relates to a control device for a cooking apparatus with a timer function which utilizes an interruption procedure and, more particularly, to a control device for use in a cooker having a cooking time-setting function, such as a microwave range.

A cooker such as a microwave range generally has an operation panel on the front surface of its housing. A rotary operation knob with a cooking time-setting scale is arranged on the operation panel. The operation knob is connected to an operation shaft of a variable resistor at the rear side of the operation panel. A voltage signal based on a change in resistance of the variable resistor is converted into a digital signal by and A/D (Analog/Digital) converter. The digital signal is input, as cooking time-setting information, to a controller. The controller includes a microprocessor and its peripheral circuits, and it controls the overall operation of the microwave range on the basis of the cooking time-setting information and other input information.

When a user wishes to cook food, in practice, he or she turns the operation knob while observing the cooking time-setting scale on the operation panel, thereby setting a desired cooking time. The user then depresses a cooking-start key.

In a conventional microwave range of this type, as noted above an A/D converter is used to convert an output from a variable resistor into a digital signal. However, since the A/D converter is expensive, it is one of the main factors accounting for an increase in the total cost of the cooking apparatus. In addition, maximum and minimum values of the cooking time-setting scale on the operation panel are limited. Such limitations restrict a maximum value usable for time-setting and often result in time-setting errors.

SUMMARY OF THE INVENTION

It is therefore an object of the present invention to provide a new and improved control device for a cooking apparatus with a timer function which utlizes an interruption procedure, the device reducing the cost of the apparatus by omitting the A/D converter, increasing the cooking time-setting range, and improving time-setting precision.

According to the present invention, there is provided a control device for a cooking apparatus, comprising:

a housing including a heating chamber and an operation section;

cooking operation means, arranged in the operation section, for allowing cooking operations;

display means, arranged in the operation section, for displaying at least numerical information;

cooking time-setting means for setting cooking time in the operation section, upon rotation thereof;

encoder means, coupled to the cooking time-setting means, for generating a pulse signal whose number of pulses corresponds to an angular position of the cooking time-setting means; and control means, connected to the heating chamber, the cooking operation means, the display means, and the encoder means, for executing an interruption procedure in response to the pulse signal from the encoder means, counting the number of pulses of the pulse signal to fetch the number of pulses as cooking time-setting information set by the cooking time-setting means, sending the cooking time-setting information to the display means, and sending a control signal corresponding to the cooking time-setting information to the heating chamber, in accordance with the operation of the cooking operation means.

BRIEF DESCRIPTION OF THE DRAWINGS

These and other objects and features of the present invention can be understood through the following embodiments, with reference to the accompanying drawings, in which:

FIGS. 5A and 5B and FIGS. 6A and 6B are timing charts of pulse signals output from the encoder shown in FIG. 2.

DETAILED DESCRIPTION OF THE PREFERRED EMBODIMENT

A preferred embodiment of the present invention will now be described, with reference to the accompanying drawings.

Figure 1:
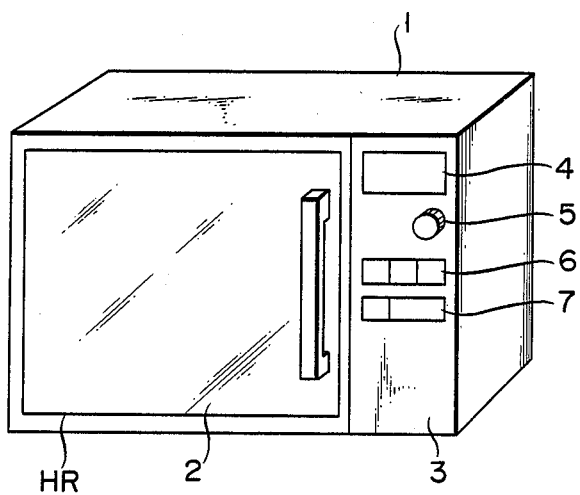
FIG. 1 is a perspective view showing the outer appearance of a cooking apparatus according to an embodiment of the present invention.

Referring to FIG. 1, reference numeral 1 denotes a housing of a microwave range used as a cooking apparatus. Door 2 is supported at the front surface of housing 1, and can be opened/closed with respect thereto. Operation panel 3 is also arranged on the front surface of housing 1. Heating chamber HR is formed inside housing 1, at a position corresponding to door 2. Panel 3 includes digital display 4, cooking time-setting rotary operation knob 5, cooking mode-set key 6, and cooking start key 7.

Figure 2:
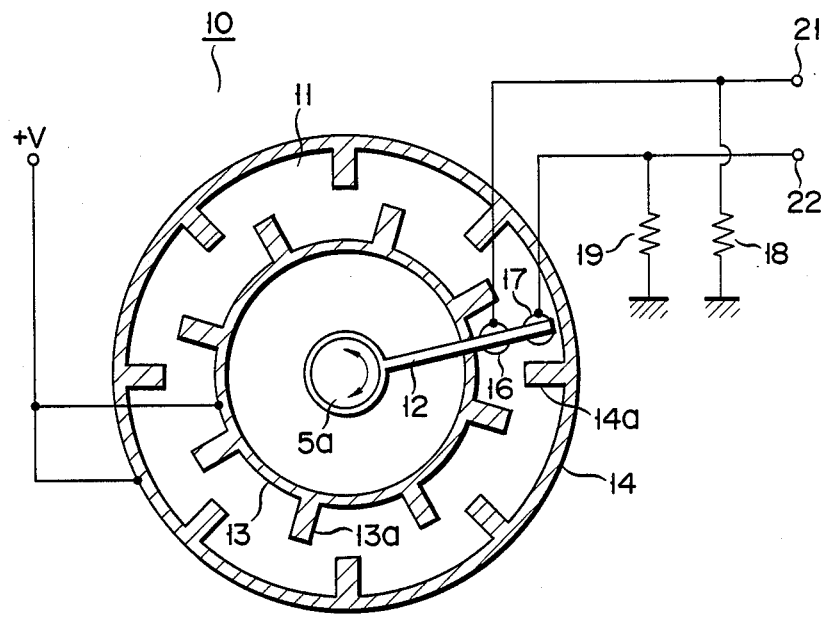
FIG. 2 is a plan view showing the arrangement of an encoder used in the apparatus of FIG. 1.
Figure 3:
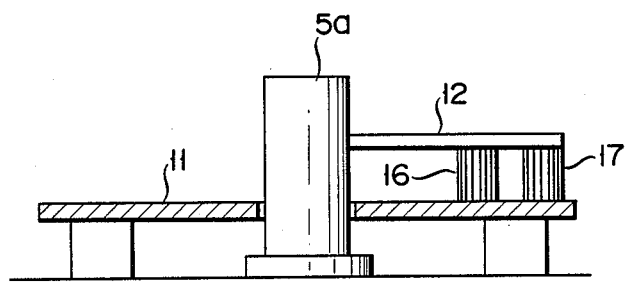
FIG. 3 is a side view of the encoder shown in FIG. 2.

Knob 5 extends inside housing 1, through operation panel 3. Encoder 10 is arranged at the extended end of knob 5, as is shown in FIGS. 2 and 3. Encoder 10 comprises disc 11, the center of which receives rotating shaft 5a of knob 5, a pair of conductive patterns 13 and 14 concentrically formed on disc 11, bar 12 extending from rotating shaft 5a, along the radial direction of disc 11, and conductive brushes 16 and 17 extending downward from predetermined positions of bar 12. DC voltage V is applied to patterns 13 and 14, and voltages appear as output voltages at connecting points between brushes 16 and 17 and resistors 18 and 19 connected between brushes 16 and 17 and ground. The output voltages are extracted from terminals 21 and 22.

Conductive pattern 13 has radial projections 13a on disc 11. Projections 13a extend outward at equal angular intervals. Conductive pattern 14 also has radial projections 14a on disc 11. Projections 14a extend inward at equal angular intervals. The angular positions of projections 13a are slightly offset from those of projections 14a. Also, bar 12 is made of an insulator, whereas conductive brush 16 comprises a large number of thin flexible conductors. The lower end of brush 16 can be brought into contact with each projection 13a. Conductive brush 17 also comprises a large number of thin flexible conductors, and the lower end of brush 17 can be brought into contact with each projection 14a.

Figure 4:
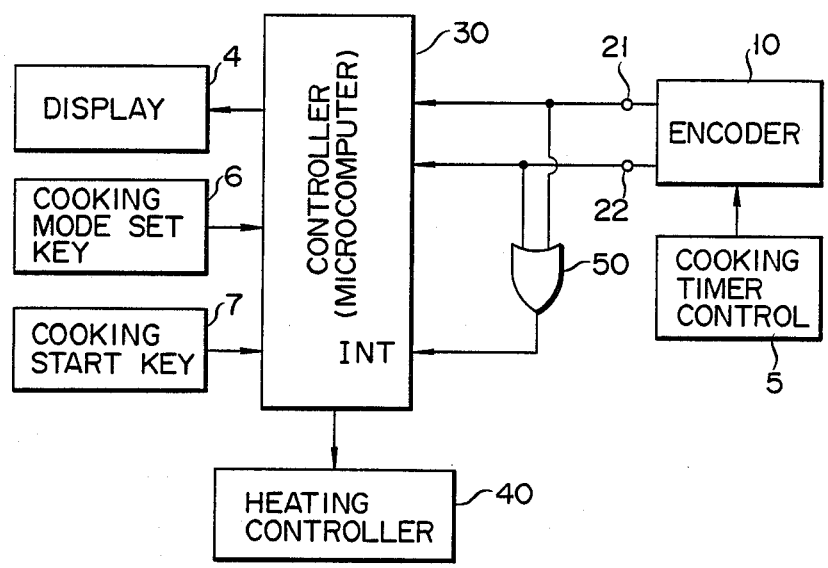
FIG. 4 is a block diagram of a control circuit of the apparatus shown in FIG. 1.

FIG. 4 shows a control circuit of the apparatus. Reference numeral 30 denotes a microcomputer used as a controller. Microcomputer 30 is connected to display 4, cooking mode-set key 6, cooking start key 7, heating controller 40, and terminals 21 and 22 of encoder 10. Outputs at terminals 21 and 22 are supplied to interrupt input terminal INT of microcomputer 30, via OR gate 50.

The operation of the microwave range having the above arrangement will now be described.

When the user turns operation knob 5, conductive brushes 16 and 17 coupled to bar 12 are selectively brought into sliding contact with projections 13a and 14a of conductive patterns 13 and 14. Each time brushes 16 and 17 are respectively brought into contact with subsequent projections 13a and 14a, different voltages appear at resistors 18 and 19. The voltage signals appear as pulse signals at terminals 21 and 22.

If the user turns operation knob 5 clockwise, conductive brush 17 is brought into sliding contact with first projection 14a before conductive brush 16 is brought into sliding contact with first projection 13a. As is shown in FIGS. 5A and 5B, the phase of the pulse signal at terminal 22 is slightly advanced with respect to that of the pulse signal at terminal 21. However, when the user turns operation knob 5 counterclockwise, brush 17 is brought into sliding contact with projection 14a after brush 16 is brought into sliding contact with projection 13a. In this case, as is shown in FIGS. 6A and 6B, the phase of the pulse signal at terminal 21 is slightly advanced with respect to that of the pulse signal at terminal 22.

Upon generation of the pulse signals from encoder 10 (i.e., terminals 21 and 22), they are fetched by microcomputer 30. An output from OR gate 50 goes to logic "1". In other words, a signal of logic "1" is input to interrupt input terminal INT of microcomputer 30. Each time the signal of logic "1" is input to interrupt input terminal INT, microcomputer 30 executes the interruption procedure. During the interruption procedure, microcomputer 30 counts the pulses of the pulse signals generated by encoder 10, and it fetches the count values as cooking time-setting information. At the time of pulse-signal counting, if the phase relationship between the pulse signals satisfies the state shown in FIGS. 5A and 5B, microcomputer 30 counts up the pulses. However, if the phase relationship satisfies the state shown in FIGS. 6A and 6B, microcomputer 30 counts down the pulses, and it causes display 4 to display cooking time-setting information.

The user can turn operation knob 5 while observing the display on display 4, and the user can set a desired cooking time. When the user depresses cooking start key 7, microcomputer 30 commands heating controller 40 to begin cooking. Microcomputer 30 decrements the display contents of display 4 as cooking progresses. Cooking is stopped when the display content is "0".

As is apparent from the above description, encoder 10 generates the pulse signals in synchronism with the operation of operation knob 5. The pulses of the pulse signals from encoder 10 are counted by microcomputer 30, and the count values are fetched as cooking time-setting information. According to the present invention, therefore, and A/D converter can be omitted, unlike in a conventional cooking apparatus, thereby reducing the overall cost. In microcomputer 30, the pulses of the pulse signals are counted by the interruption procedure, and the interruption procedure is performed each time the pulse signals are generated. As a result, the pulses of the pulse signals can be properly counted without omissions. At the same time, the fetched cooking time-setting information is displayed on display 4. In addition, the rotational angle of operation knob 5 is not limited, and thus, maximum and minimum cooking-setting times are not restricted. Therefore, the cooking time-setting range can be increased to greatly improve the setting precision, in cooperation with accurate pulse-counting.

The control device according to the present invention comprises the rotary operation knob, the encoder for generating pulse signals in synchronism with the operation of the operation knob, the controller for executing the interruption procedure in response to the pulse signals from the encoder and for fetching the count values as cooking time-setting information, and the display for displaying the cooking time-setting information fetched by the controller.

When the user turns the rotary operation knob, the encoder sequentially generates pulse signals whose numbers of pulses correspond to the angular positions of the knob. The pulse signals are then input to the controller which then executes the interruption procedures. More specifically, the number of pulses of the pulse signal is counted, and the count value is fetched as the cooking time-setting information. The fetched cooking time-setting information is displayed on the display.

In the above embodiment, the present invention is applied to a microwave range. However, the present invention is applicable to any other cooking apparatuses which require cooking time-setting. In the above embodiment, and encoder is used in which pulse signals are generated upon electrical contacts between the conductive patterns and the conductive brushes. However, an encoder may generate pulse signals by transmission or shielding of light between light-emitting and light-receiving elements.

What is claimed is:

1. A control device for a cooking apparatus, comprising:

a housing including a heating chamber and an operation section;

cooking operation means, arranged in said operation section, for allowing cooking operations;

display means, arranged in said operation section, for displaying at least numerical information;

cooking time-setting means for setting cooking time in said operation section, upon rotation of a rotating shaft thereof;

encoder means, coupled to said cooking time-setting means, for generating first and second pulse trains for providing a phase difference corresponding to a rotational direction of said rotating shaft of said cooking time-setting means, the number of pulses in said first and second pulse trains corresponding to an angular position of said cooking time-setting means; and control means, connected to said heating chamber, said cooking operation means, said display means, and said encoder means, for executing an interruption procedure in response to said first and second pulse trains from said encoder means, counting the number of pulses of said first and second pulse trains, fetching the number of pulses as cooking time-setting information set by said cooking time-setting means, sending the cooking time-setting information to said display means, and sending a control signal corresponding to the cooking time-setting information to said heating chamber, in accordance with the operation of said cooking operation means.

2. A device according to claim 1, wherein said control means counts up when a phase of the first pulse train is advanced with respect to that of the second pulse train, and counts down when the phase of the second pulse train is advanced with respect to that of the first pulse train.

3. A device according to claim 1, wherein said encoder means includes a base, a central portion which receives said rotating shaft of said cooking time-setting means, a pair of conductive patterns concentrically formed on said base and having staggered projections at predetermined angular intervals, and insulating bar extending from said rotating shaft, along a radial direction of said base, a pair of conductive brushes formed on said bar which may be intermittently brought into sliding contact with said pair of conductive patterns, respectively, means for supplying a DC voltage to said pair of conductive patterns, and means for extracting pulse signals generated upon intermittent contacts being made between said pair of conductive brushes and said staggered projections.

4. A device according to claim 3, wherein said means for extracting pulse signals includes a pair of resistors connected between said pair of conductive brushes and a reference potential point.

* * * * *